Feb. 5, 1952 J. W. GRAY 2,584,866
FREQUENCY MEASURING DEVICE
Filed Oct. 28, 1949 3 Sheets-Sheet 2

Inventor
JOHN W. GRAY
By H. S. Mackey
Attorney

Inventor
JOHN W. GRAY
Attorney

Patented Feb. 5, 1952

2,584,866

UNITED STATES PATENT OFFICE 2,584,866

FREQUENCY MEASURING DEVICE

John W. Gray, White Plains, N. Y., assignor to General Precision Laboratory Incorporated, a corporation of New York Application October 28, 1949, Serial No. 124,001

16 Claims. (Cl. 175—368)

This invention pertains to an electrical frequency measuring device and more specifically to a position servomechanism which is actuated in accordance with the frequency of an alternating electric potential.

The frequency of an alternating potential can be measured by successively charging and discharging a small condenser at a fixed potential, rectifying the induced charging currents and observing the magnitude of the resulting direct current, which is proportional to the input frequency when the output voltage is constant. Such a device may be termed a frequency converter in the sense that it converts electrical frequency to a proportional electrical current.

In many computer applications it is often desirable to convert the measurement of the frequency of an impressed wave into a shaft rotation the angular position of which is a measure of that frequency.

In general, the purpose of this invention, therefore, is to provide an arrangement whereby the frequency of any alternating current signal is indicated by the angular shaft position to a high degree of accuracy.

In this method of measurement the peak-to-peak potential of the input signal must be held constant, and the wave shape must be of a flat-top type. Therefore an input signal of rectangular shape is preferable, and unless the input signal potential is perfectly constant, the frequency measuring device must incorporate a clipper-amplifier to present to the measuring stage a perfectly constant potential signal. Another condition which must be satisfied is constancy of the rectified output voltage.

One way in which the output voltage may be held constant is to control it through a servo system or servomechanism. Such a device includes a negative feedback loop, which is made to vary the rectified charging current in such a way as to keep the output voltage constant. The servo equipment must also include a subtracting device such as is required at the feedback point of any negative feedback loop. In this case it subtracts the feedback signal from a function of the rectified current to produce an error signal. The use of a feedback loop greatly enhances the accuracy and when it is a part of a position servomechanism the further advantage is gained of having an output power shaft inherently available, the angular position of which is proportional to the input signal frequency.

The servomechanism loop which is employed includes a high-gain amplifier which may be either a direct current amplifier operated by the rectified charging potential of the frequency-measuring condenser, or an alternating current amplifier operated by the same voltage before rectification.

This invention may be understood more clearly from the following detailed description accompanied by the drawings in which.

Figure 1:
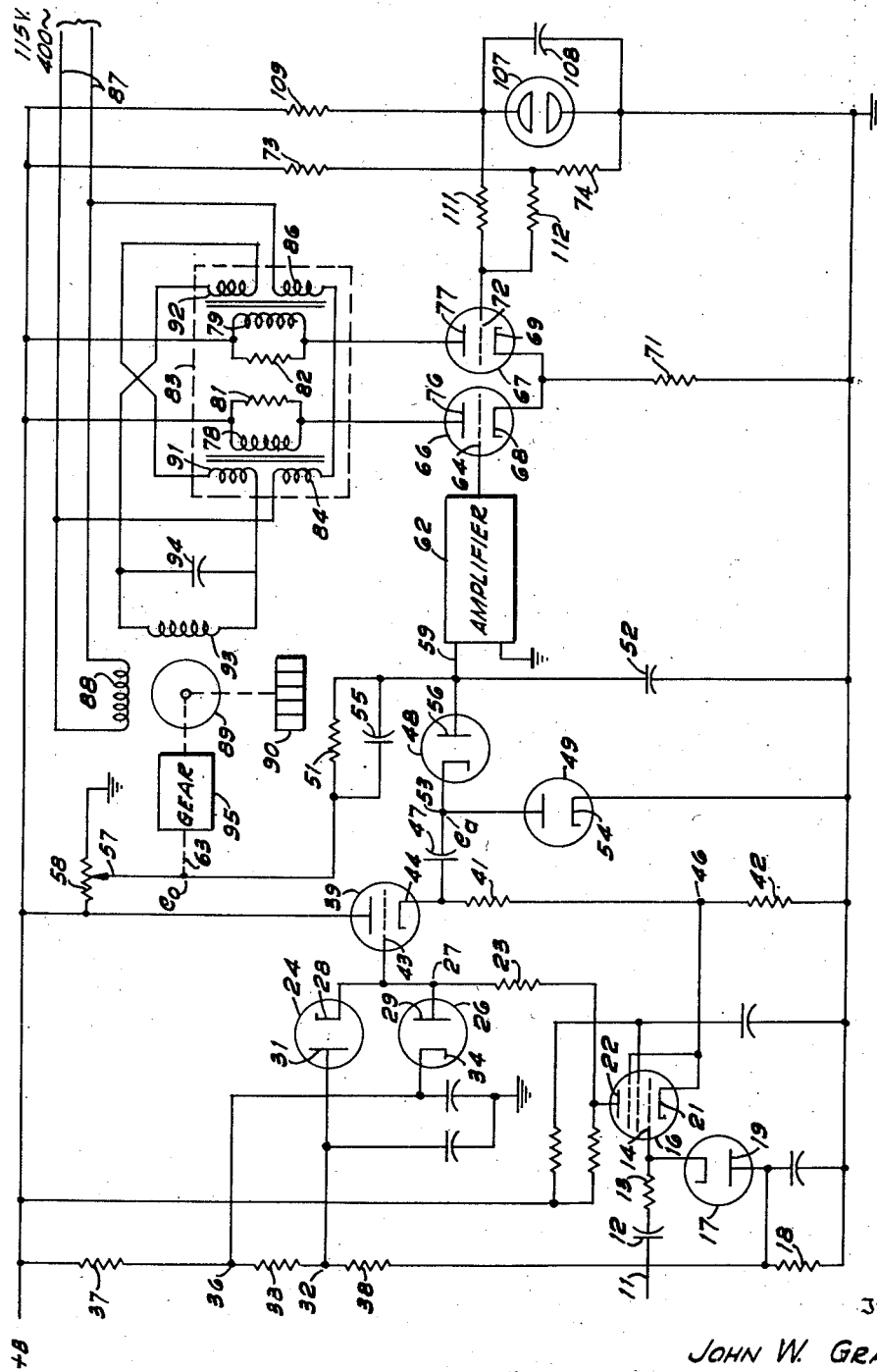
Figure 1 is a schematic illustration of the invention.

Referring now to Fig. 1, an input signal of which the frequency is to be measured is received through the conductor 11, condenser 12 and resistor 13 and applied to the control grid 14 of a pentode amplifier tube 16. The grid 14 is also connected to ground through a diode 17 and resistor 18 which forms part of a voltage divider so that the anode 19 of the diode 17 is held at about 2½ volts above ground. Under these conditions negative voltage peaks of less than +2½ volts pass to ground while strong positive voltage peaks make the control grid 14 more positive than the approximately 5 volt potential of the cathode 21. The grid then draws current, limiting the positive peaks.

The resulting squared potential having both its positive and negative peaks thus limited is amplified by the pentode amplifier tube 16 and the output is taken from the anode 22 through the resistor 23 to another limiter consisting of two diodes 24 and 26. The signal is introduced at a common junction 27 connected to the cathode 28 of diode 24 and anode 29 of diode 26. The anode 31 of diode 24 is connected to the low-potential end 32 of a resistor 33 forming part of a voltage divider, while the cathode 34 of the diode 26 is connected to the high-potential end 36 of the same resistor 33. A potential drop is produced in the resistor 33 by reason of its series connection with resistors 37, 38 and 18 between a source of positive (+B) potential and ground. This drop is, for example, 60 volts, placing the anode 31 at about 95 volts and the cathode 34 at about 155 volts. Therefore as the plate 22 of the pentode 16 changes in potential, which is normally much more than 60 volts, all peaks above 155 and below 95 volts are clipped by the diodes 24 and 26 and the signal wave shape is made more nearly square.

The resulting rectangular signal, thus amplified, clipped and with its voltage levels made to be those of the ends 32 and 36 of the voltage divider resistor 33, actuates a cathode follower so that a low output impedance signal may be secured which is more suitable for actuation of the frequency-measuring stage. The cathode follower includes a triode 39 and cathode resistances 41 and 42, with the signal applied to the grid 43 and the low-impedance output secured from the cathode 44.

The cathode connection of the pentode 16 is made to the junction 46 of the cathode follower resistors 41 and 42. This provides positive feedback to increase the amplification of the pentode, for a positive signal on the grid 14 of the pentode 16 produces increased plate current, lower plate voltage, lower voltage of the cathode 44 and consequently lower voltage of the grid 43 and cathode 21, thus enhancing the reduction in negative grid bias of the pentode and further increasing its plate current.

The frequency-measuring stage consists of a small condenser 47, two diodes 48 and 49 connected in series, a plate resistor 51, and a smoothing condenser 52. The condenser 47 is connected between the cathode 44 of the cathode follower tube 39 and the junction 53 of the two diodes. The cathode 54 of diode 49 is connected directly to ground, while the anode 56 of the other diode 48 is connected through resistor 51 to the slider 57 of a voltage divider 58 so that an adjustable positive potential can be applied. This anode is also connected to a grounded smoothing condenser 52.

Figure 4:
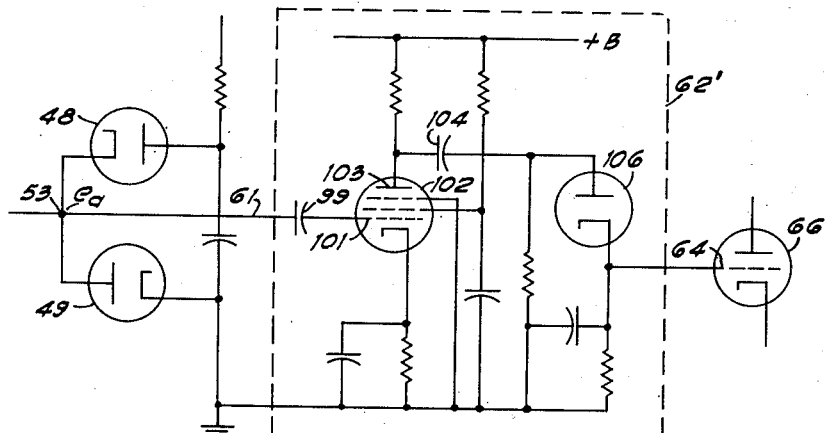
Figure 4 illustrates schematically one form of alternating-current amplifier which may be employed.

The output connection of this frequency-measuring stage is taken from the anode 56 through conductor 59 and impressed on a direct current amplifier 62 as illustrated in Fig. 1. Alternatively, as illustrated in Fig. 4 wherein an alternating current amplifier 62' is used, the input of the amplifier is connected through a conductor 61 to the common diode junction 53. The dashed line 63 represents the shaft of an automatic means of adjustment of the slider 57, and is part of the negative feedback link of a servomechanism to be described later.

It will be apparent that the connections of the frequency-measuring stage are those of a voltage doubler. During the positive half of an alternating input signal the condenser 47 is charged positively through the diode 49 and ground to the crest voltage. During the following negative half cycle the charging current flows from the ground connection through the large condenser 52 and diode 48 into the condenser 47, so that in the absence of any output current drain or input current flow through resistor 51 the charging potential is added to the potential of the charge already placed on the condenser 47 to make the potential of the anode 56 approximately double the crest input voltage or equal to the peak-to-peak input signal voltage. Therefore, if the anode 56 had no other connections it would remain at a negative or below-ground direct-current potential having this peak-to-peak value.

However, the connection of the anode 56 through resistor 51 to an adjustable positive potential source 58 maintains the anode 56 at a fixed average direct-current potential having a value between the peak-to-peak negative value and zero or ground potential, and a direct current flows through the resistor 51 toward the anode 56. The average value of this current is strictly proportional to the frequency of the input signal as will be apparent from the following.

Figure 2A:
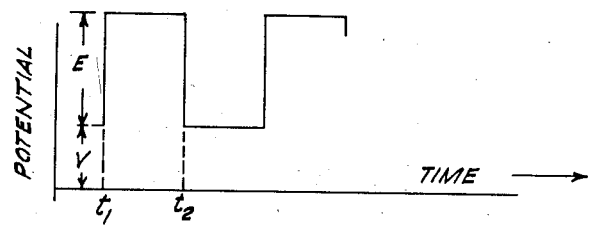
Figures 2A, 2B, 2C and 2D depict various electrical wave forms referred to in explaining the operation of the invention.
Figure 2B:
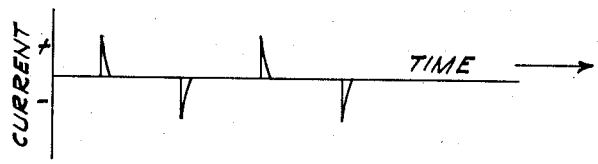

The input signal received from the cathode 44 of the cathode follower is represented by the graph depicted in Fig. 2A, with a peak-to-peak potential E and a minimum value V. This potential impressed on the condenser 47 results in pulses of charging current into and out of condenser 47 as represented by Fig. 2B. The time constant of the condenser 47 and associated resistors is made small so that these pulses decrease to practically zero long before the termination of each half cycle. Under this condition the quantity of charge, $q_1$, stored in the condenser 47 having capacitance C during each positive half cycle of the rectangular input signal wave is $$q_1 = C(E+V) \qquad (1)$$

Assuming that the diodes are perfect, during the positive half cycle the induced charge on the right side of the condenser 47 flows to ground through the diode 49 so that the potential of that side of the condenser becomes that of ground or zero, and the potential difference of the condenser plates is $E+V$. During the following negative half cycle the potential of the left side of the condenser changes to V, and since the potential of the right side is still lower than that of the left side by $(E+V)$, the right side potential becomes $V-(E+V)$ or $-E$ volts. In the absence of current flow through the resistor 51 this drop in potential would cause current flow through the diode 48 until the anode 56 also attained $-E$ volts, but since by servo action as will be later explained a current flow is permitted through resistor 51 of exactly the right amount to bring the average negative potential of anode 56 to $-e_c$ volts, a potential between $-E$ and zero, the anode 56 can fall only to $-e_c$ volts, and current flow through the diode 48 brings the right side of condenser 47 also to $-e_c$ volts. The average potential difference of the plates of condenser 47 is then $V+e_c$, and the quantity of charge $q_2$ placed thereon by this potential difference during each negative half cycle is $$q_2 = C(V+e_c) \qquad (2)$$

The net charge of condenser 47 during the change from the positive half cycle to the negative half cycle is then obtained by subtracting Equation 1 from 2

$$q_1-q_2 = C(E-e_c) \qquad (3)$$

Setting $$E-e_c = E_0 \qquad (4)$$
$$q_1-q_2 = CE_0 \qquad (5)$$

The net charge $q_1-q_2$ is charge per cycle passed through the diode 48, therefore, the charge per second through this path is this charge multiplied by the frequency and the product is the current, or $$i = f(q_1-q_2) = fCE_0 \qquad (6)$$

This direct current $i$ which can come only through the resistor 51, the amplifier 62 being assumed to draw no current and no direct current flow being possible through the condenser 47, is thus shown to be proportional to the frequency of the input signal, C and $E_0$ being constant.

Figure 2C:
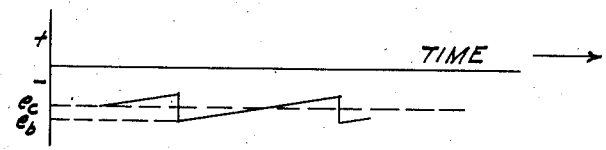

Fig. 2C illustrates the change of potential of the anode 56 through the cycle. It drops to $e_b$ at the beginning of each negative half cycle of input signal, then is slowly raised as the condenser 52 is charged positively by the positive source of potential of magnitude $e_0$ at the voltage divider slider 57, charging through the high resistance 51. The graph therefore shows an exponential increase from the low point throughout the remainder of each cycle. The average potential, $e_c$, will therefore depend on the constants of the circuit and on the value $e_b$. The time constant of the condenser 52 and resistor 51 is made so large, however, that the amount of exponential rise of the curve of Fig. 2C is negligible, and $e_c$ practically equals $e_b$. The average current through resistor 51 is dependent on the potential $e_c$ and on that at the slider 57, $e_0$, or $$e_0 = iR - e_c \quad (7)$$

Substituting in (7), the value of $i$ from (6)

$$e_0 = fCE_0R - e_c \quad (8)$$

That is, the potential setting of the voltage divider slider slider 57 is proportional to the frequency $f$, where $e_c$ is maintained constant.

Figure 2D:
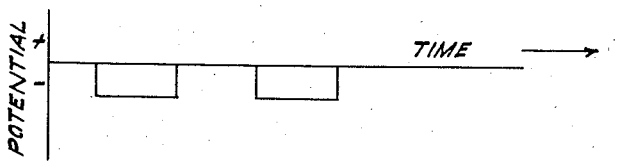

The potential of the junction 53, $e_a$, is illustrated in Fig. 2D. It is obviously zero during positive half cycles, when the passage of the condenser charging current through the diode 49 equalizes $e_a$ with ground potential, and it is at the potential of the anode 56 during negative half cycles due to the equalizing action of the diode 48. Therefore, the peak-to-peak value of $e_a$ is a function of and closely equal to the average direct-current potential $e_c$. This indicates that either the conductor 59 or the conductor 61 may be employed as the output conductor to actuate an appropriate type of following amplifier, the potential of the conductor meanwhile being maintained constant by means of a servomechanism in the following manner.

The amplifier 62, Fig. 1 is actuated by a small change of input voltage through conductor 59 and the amplified output direct-current potential actuates the grid 64 of an electronic tube 66 which together with tube 67 forms a differential amplifier. The cathodes 68 and 69 are connected through a common cathode resistor 71 to ground. The grid 72 of the tube 67 is held at a fixed potential by connection to a voltage divider composed of resistors 73 and 74 connected between +B potential and ground, disregarding for the moment the glow tube 107. The anodes 76 and 77 of the differential amplifier are connected to a source of positive potential through control windings 78 and 79 of a duplex saturable transformer, the windings being shunted by resistors 81 and 82 to provide surge discharge paths. Upon reception by the control grid 64 of a signal such as a step increase of direct potential from the amplifier 62, the anode current increases through the control winding 78. This current flowing through the cathode resistor 71 raises the potential of cathode 69, thereby reducing the anode current of tube 67 and thus the current through the control winding 79 by an approximately equal amount. Thus any change of potential on the control grid 64 produces a corresponding change in current through the control winding 78 and a change of opposite sense and like amount in the winding 79.

The saturable transformer 83 has in addition to the two aforementioned control windings two primary windings 84 and 86 connected in series aiding to a source of 400-cycle potential through the conductors 87. This source is also connected to one field winding 88 of a two-phase motor of which the rotor 89 is connected to rotate the shaft 63. The transformer also has two secondary windings 91 and 92 connected in series opposed and to the remaining field winding 93 of the two-phase motor. The winding 93 has a condenser 94 in shunt thereto to improve the power factor of the load on the transformer. The secondary windings 91 and 92 of the transformer 83 produce equal and opposite potentials when the control winding currents are equal, but when the control winding 78 carries more current than does the winding 79, the voltage of the secondary winding 91 becomes less than that of the winding 92, and a net voltage is produced which is approximately at quadrature with the voltage across the winding 88 because of the high magnetic leakage of the transformer, and which therefore operates the rotor 89. Hence this rotor turns in a direction and at a speed dependent upon the magnitude of the input signal on the grid 64.

Rotation of the rotor 89 moves the slider 57 and changes the potential $e_0$ in such direction as to maintain the input signal $e_c$ on conductor 59 Fig. 1 (or $e_a$ on conductor 61 Fig. 4) at a constant value. That is, it neutralizes the small change in potential constituting the postulated input signal.

It is well-known that in any servomechanism having a negative feedback loop and including a very high gain amplifier, the input and output are very closely proportional, for the amplifier input is minute and the primary input minus the feedback output equals the amplifier input. In this case the feedback output is the angular position of the shaft 63. Because of the servo relationship this angular shaft position is proportional to the primary input signal frequency within exceedingly small limits of error. A dial 90 is therefore added to the shaft 63 of the motor 89 to indicate, as the output quantity of the frequency measuring device, the frequency of the input signal.

In order to eliminate the possibility of hunting it is desirable to add a small phase-advancing or anticipator condenser 55 in shunt with the resistor 51. This of course has no effect on steady voltages, but during the time that the slider 57 is seeking its null position and the voltage $e_0$ is being reduced, the condenser magnifies the change of $e_0$ in its application to the amplifier input conductor 59, so that the approach of the servomechanism to its null is anticipated in the early reduction of the error voltage, and the servomechanism output motion is effectively damped.

The servomechanism has some error principally because of the static friction of the servomotor. In the absence of correction this error would cause a small amount of random error in the determination of the value of frequency of the input signal. To overcome this error there is provided a dither device which periodically varies the reference grid 72 of the differential amplifier by an amount approximately equal to the amount of the zero error. Such a device, by keeping the mechanism in continuous movement over a small range, largely eliminates static friction or "stiction," which comes into being only at the instant of putting a stationary body into motion. This dither device consists of a neon tube 107 bridge by a condenser 108. Both tube and condenser are in series with a resistor 109 across a source of positive potential. This source charges the condenser 108 to the break-down potential of the neon tube 107 and the latter fires, but the resistance 109 is so high that the current permitted to flow through it is not sufficient to support the glow discharge of the tube 107, which is therefore extinguished when the charge stored in the condenser no longer can support it and this cycle then repeats itself. The sizes of condenser and resistance are selected to produce a low cyclic frequency. The dither voltage junction of the condenser 108 and resistor 109 is connected through two resistors 111 and 112 with the constant-voltage midpoint of the voltage divider consisting of the resistors 73 and 74 and the junction of the resistors 111 and 112, constituting another voltage divider, is connected to the grid 72 so that the dither voltage applied to the grid is that of the junction. The oscillatory dither potential applied through the saturable transformer 83 keeps the motor 89 in a state of vibratory motion of very small amplitude, or in an incipient vibrating condition, which is almost or quite taken up in the lost motion of linkages and backlash of reducing gears 95 before it reaches the slider 57. Because of the use of such a dither mechanism, however, any energizing signal, even though small, is added to the dither signal to produce a definite motor rotation.

Figure 3:
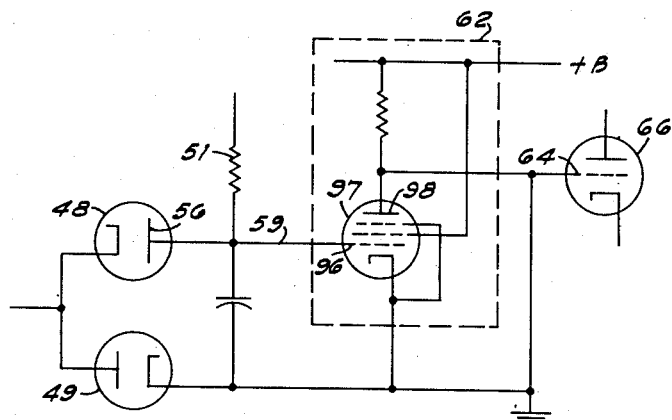
Figure 3 illustrates schematically one form of direct-current amplifier which may be employed.

A direct current amplifier for employment as amplifier 62, Fig. 1, is shown schematically in Fig. 3. It employs as input the direct-current potential at the anode 56 obtained through conductor 59 having the form depicted in Fig. 2C with peaks of magnitude $e_b$ and an average value $e_c$ which is to be maintained constant as one of the basic requirements of this invention. The conductor 59 conducts these input signals from the anode 56 of diode 48 to the control grid 96 of a pentode 97. The amplified output is taken from the anode 98 of the pentode and actuates the control grid 64 of the tube 66 which is shown in Fig. 1 and was previously described.

An alternating current amplifier 62' for employment in place of amplifier 62, Fig. 1 is shown schematically in Fig. 4. As previously mentioned in connection with Figs. 2C and 2D, the peak-to-peak potential $e_a$ of the alternating current at the junction 53 is strictly proportional to and practically equal to the maximum direct-current potential at the anode 56, and therefore may be employed as input to the amplifier instead of that direct-current potential. The conductor 61 conducts alternating input signals having this peak-to-peak potential from the diode junction 53 through a coupling condenser 99 to the control grid 101 of a pentode 102. The alternating output of this pentode amplifier is taken from its anode 103, and after passage through a coupling condenser 104 undergoes half-wave rectification in the diode 106; the resulting direct-current potential is smoothed by the resistance 60 and condenser 65, and is applied to the control grid 64 of the triode 66 forming one tube of the differential amplifier as described in connection with Fig. 1.

This invention has the advantage of almost complete freedom from error caused by variation of B-battery potential. Such variation will cause a proportional error in the potential $e_0$ of the voltage divider slider 57, Fig. 1, at any specific setting, and as shown by Equation 2 will cause a corresponding error in the output. However, the input signal potential is determined by the voltage drop E in the resistor 33 which also is proportional to the B-battery potential, and this aberration cancels that of $e_0$ as shown in Equation 3.

It is of course, obvious that the servomechanism feed-back shaft may actuate a variable resistor instead of a voltage divider so that the current in the resistor 51 is varied directly through variation of a resistance instead of through variation of the potential $e_0$. The variable resistor control motion in this case will be a reciprocal measure of the frequency, i. e. a proportional measure of cycle duration or period.

The term ground as used herein and in the appended claims is intended to be used in the broad sense as referring to a datum potential rather than in its strict sense of an earthed connection.

What is claimed is:

1. A frequency measuring device comprising, a condenser having impressed thereon an alternating signal wave of a frequency desired to be measured, a rectifier connected between one terminal of said condenser and ground, a circuit comprising a second rectifier in series with a resistor connected between said condenser terminal and a source of positive potential whereby the current flowing through said second rectifier as a result of the varying charge of said condenser produces a potential drop in said resistor, a feedback loop including an amplifier having as its input terminal one terminal of said second rectifier, the output of said loop constituting said source of positive potential and indicating means for indicating the value of said positive potential.

2. A frequency measuring device comprising, a condenser having impressed thereon an alternating signal wave of a frequency desired to be measured, a diode having its anode connected to one terminal of said condenser and its cathode connected to ground, a second diode having its cathode connected to said condenser terminal and its anode connected to a source of positive potential through a resistor whereby the current flowing through said second diode as a result of the varying charge of said condenser produces a potential drop in said resistor, a feedback loop including an amplifier having as its input terminal one terminal of said second rectifier, the output of said loop constituting said source of positive potential and indicating means for indicating the value of said positive potential.

3. A frequency measuring device comprising, means for generating a square wave form of constant amplitude and having a frequency equal to the frequency of a signal wave whose frequency is to be measured, a condenser, circuit means for impressing said square wave form on said condenser, a rectifier connected between one terminal of said condenser and ground, a circuit comprising a second rectifier in series with a resistor connected between said condenser terminal and a source of positive potential whereby the current flowing through said second rectifier as a result of the varying charge of said condenser produces a potential drop in said resistor, a feedback loop including an amplifier having as its input one terminal of said second rectifier, the output of said loop constituting said source of positive potential and indicating means for indicating the value of said positive potential.

4. A frequency measuring device comprising, means for generating a square wave form of constant amplitude and having a frequency equal to the frequency of a signal wave whose frequency is to be measured, a condenser, circuit means for impressing said square wave form on said condenser, a diode having its anode connected to one terminal of said condenser and its cathode connected to ground, a second diode having its cathode connected to said condenser terminal and its anode connected to a source of positive potential through a resistor whereby the current flowing through said second diode as a result of the varying charge of said condenser produces a potential drop in said resistor, a feedback loop including an amplifier having as its input one terminal of said second diode, the output of said feedback loop constituting said source of positive potential and indicating means for indicating the value of said positive potential.

5. A frequency measuring device comprising a condenser having impressed thereon an alternating signal wave of a frequency desired to be measured, a rectifier connected between one terminal of said condenser and ground, a circuit comprising a second rectifier in series with a resistor connected between said condenser terminal and a source of variable potential whereby the difference in charge imposed on said condenser by the alternations of the signal wave impressed thereon produces a current flow through said second rectifier and said series connected resistor, means operated in accordance with the potential of one terminal of said second rectifier for adjusting said variable potential in such a direction and to such an extent that the potential drop produced by current flow through said resistor in conjunction with said variable potential maintains a substantially constant potential at a terminal of said second rectifier and means for indicating the amount of adjustment of said variable potential.

6. A frequency measuring device comprising, a condenser having impressed thereon an alternating signal wave of a frequency desired to be measured, a diode having its anode connected to one terminal of said condenser and its cathode connected to ground, a second diode having its cathode connected to said condenser terminal and its anode connected through a resistor to a source of variable potential whereby the current flowing through said second diode as a result of the varying charge of said condenser produces a potential drop in said resistor, means operated in accordance with the potential of one terminal of said second diode for adjusting said variable potential in such a direction and to such an extent that the potential drop produced by current flow through said resistor in conjunction with said variable potential maintains a substantially constant potential at the anode of said second diode and means for indicating the amount of adjustment of said variable potential.

7. A frequency measuring device comprising, a condenser having impressed thereon an alternating signal wave whose frequency is to be measured, a diode having its anode connected to one terminal of said condenser and its cathode connected to ground, a second diode having its cathode connected to said condenser terminal and its anode connected to a source of positive potential through a resistor whereby the current flowing through said second diode as a result of the varying charge of said condenser produces a potential drop in said resistor, a feedback loop including a direct-current amplifier having its input connected to the anode of said second diode, the output of said loop constituting said source of positive potential and indicating means for indicating the value of said positive potential.

8. A frequency measuring device comprising, a condenser having impressed thereon an alternating signal wave whose frequency is to be measured, a diode having its anode connected to one terminal of said condenser and its cathode connected to ground, a second diode having its cathode connected to said condenser terminal and its anode connected through a resistor to a source of variable potential whereby the current flowing through said second diode as a result of the varying charge of said condenser produces a potential drop in said resistor, means including a direct-current amplifier having its input connected to the anode of said second diode for adjusting said variable potential in such a direction and to such an extent that the potential drop produced by current flow in said resistor in conjunction with said variable potential maintains the potential at the anode of said second diode substantially constant and means for indicating the amount of adjustment of said variable potential.

9. A frequency measuring device comprising, a condenser having impressed thereon an alternating signal wave whose frequency is to be measured, a diode having its anode connected to one terminal of said condenser and its cathode connected to ground, a second diode having its cathode connected to said condenser terminal and its anode connected through a resistor to a source of variable potential whereby current flowing through said second diode as a result of the varying charge of said condenser produces a potential drop in said resistor, means including an alternating current amplifier having its input connected to the cathode of said second diode for adjusting said variable potential in such a direction and to such an extent that the potential drop produced by current flow in said resistor in conjunction with said variable potential maintains the potential at the anode of said second diode substantially constant and means for indicating the amount of adjustment of said variable potential.

10. A frequency measuring device comprising, a condenser having impressed thereon an alternating signal wave whose frequency is to be measured, a diode having its anode connected to one terminal of said condenser and its cathode connected to ground, a source of direct-current potential having a potentiometer connected in shunt thereto, a second diode having its cathode connected to said condenser terminal and its anode connected through a resistor to the sliding contact of said potentiometer whereby current flowing through said second diode as a result of the varying charge of said condenser produces a potential drop in said resistor, a direct-current amplifier having its input connected to the anode of said second diode, motor means operated by said amplifier for varying the position of said potentiometer slider in such a direction and to such an extent that the potential of said slider in conjunction with the potential drop produced by said resistor maintains the potential of the anode of said second diode substantially constant and an indicator operated by said motor means.

11. A frequency measuring device comprising, a condenser having impressed thereon an alternating signal wave whose frequency is to be measured, a diode having its anode connected to one terminal of said condenser and its cathode connected to ground, a source of direct-current potential having a potentiometer connected in shunt thereto, a second diode having its cathode connected to said condenser terminal and its anode connected through a resistor to the sliding contact of said potentiometer whereby current flowing through said second diode as a result of the varying charge of said condenser produces a potential drop in said resistor, an alternating current amplifier having its input connected to the cathode of said second diode, motor means operated by said amplifier for varying the position of said potentiometer slider in such a direction and to such an extent that the potential of said slider in conjunction with the potential drop produced by said resistor maintains the potential of the anode of said second diode substantially constant and an indicator operated by said motor means.

12. A frequency measuring device comprising, means for producing a square wave form of constant amplitude and of a frequency equal to the frequency of a signal wave whose frequency is to be determined, a condenser, circuit means for impressing said square wave form on said condenser, a diode having its anode connected to one terminal of said condenser and its cathode connected to ground, a source of direct current having a resistor connected in shunt thereto, a movable contact engaging said resistor, a second diode having its cathode connected to said condenser terminal and its anode connected through a second resistor to the movable contact of said first mentioned resistor, an amplifier having its input connected to one terminal of said second diode, motor means energized in accordance with said amplifier output and connected with said movable contact for varying the position thereof in such a direction and to such an extent that the potential at said movable contact in conjunction with the potential drop produced by said second resistor maintains the potential of the anode of said second diode substantially constant and indicator means operated by said motor means.

13. A frequency measuring device comprising, means for producing a square wave form of constant amplitude and of a frequency equal to the frequency of a signal wave whose frequency is to be determined, a condenser, circuit means for impressing said square wave form on said condenser, a diode having its anode connected to one terminal of said condenser and its cathode connected to ground, a source of direct-current having a resistor connected in shunt thereto, a movable contact engaging said resistor, a second diode having its cathode connected to said condenser and its anode connected through a second resistor to the movable contact of said first mentioned resistor, a direct-current amplifier having its input connected to the anode of said second diode, motor means energized in accordance with said amplifier output and connected with said movable contact for varying the position thereof in such a direction and to such an extent that the potential at said movable contact in conjunction with the potential drop produced by said second resistor maintains the potential of the anode of said second diode substantially constant and indicator means operated by said motor means.

14. A frequency measuring device comprising, means for producing a square wave form of constant amplitude and of a frequency equal to the frequency of a signal whose frequency is to be determined, a condenser, circuit means for impressing said square wave form on said condenser, a diode having its anode connected to one terminal of said condenser and its cathode connected to ground, a source of direct current having a resistor connected in shunt thereto, a movable contact engaging said resistor, a second diode having its cathode connected to said condenser terminal and its anode connected through a second resistor to the movable contact of said first mentioned resistor, an alternating current amplifier having its input connected to the cathode of said second diode, motor means energized in accordance with said amplifier output and connected with said movable contact for varying the position thereof in such a direction and to such an extent that the potential at said movable contact in conjunction with the potential drop produced by said second resistor maintains the potential of the anode of said second diode substantially constant and indicator means operated by said motor means.

15. A frequency measuring device comprising, a condenser having impressed thereon an alternating signal wave of a frequency desired to be measured, a rectifier connected between one terminal of said condenser and ground, a circuit comprising a second rectifier in series with a resistor connected between said condenser terminal and a source of positive potential whereby the current flowing through said second rectifier as a result of the varying charge of said condenser produces a potential drop in said resistor, a feedback loop including an amplifier having as its input terminal one terminal of said second rectifier, means operated by the output of said amplifier for maintaining the potential of one terminal of said second rectifier substantially constant and indicator means operated in accordance with said amplifier output.

16. A frequency measuring device comprising, a condenser having impressed thereon an alternating signal wave of a frequency desired to be measured, a diode having its anode connected to one terminal of said condenser and its cathode connected to ground, a second diode having its cathode connected to said condenser terminal and its anode connected through a resistor to a source of positive potential whereby the current flowing through said second diode as a result of the varying charge of said condenser produces a potential drop in said resistor, means operated in accordance with the potential of one terminal of said second diode for adjusting the difference of the potential derived from said positive source and the potential drop produced in said resistor to maintain the potential at the anode of said second diode substantially constant and means for indicating the amount of said adjustment.

JOHN W. GRAY.

REFERENCES CITED

The following references are of record in the file of this patent:

UNITED STATES PATENTS

| Number | Name | Date |
| --- | --- | --- |
| 2,482,804 | Sorensen | Sept. 27, 1949 |